(12) United States Patent
Power et al.

(10) Patent No.: US 11,992,739 B1
(45) Date of Patent: May 28, 2024

(54) APPARATUS AND METHOD FOR MEASURING LIE AND LOFT OF A GOLF CLUB

(71) Applicant: Topgolf Callaway Brands Corp., Carlsbad, CA (US)

(72) Inventors: Alex Power, Carlsbad, CA (US); Dan Marin, Ramona, CA (US)

(73) Assignee: Topgolf Callaway Brands Corp., Carlsbad, CA (US)

( * ) Notice: Subject to any disclaimer, the term of this patent is extended or adjusted under 35 U.S.C. 154(b) by 0 days.

(21) Appl. No.: 18/242,750

(22) Filed: Sep. 6, 2023

Related U.S. Application Data

(62) Division of application No. 18/085,164, filed on Dec. 20, 2022, now Pat. No. 11,752,409, which is a division of application No. 17/190,100, filed on Mar. 2, 2021, now Pat. No. 11,554,302.

(51) Int. Cl.
*A63B 60/42* (2015.01)
*A63B 53/02* (2015.01)
*G06T 7/73* (2017.01)

(52) U.S. Cl.
CPC ............... *A63B 60/42* (2015.10); *G06T 7/73* (2017.01); *A63B 53/02* (2013.01); *G06T 2207/30221* (2013.01)

(58) Field of Classification Search
CPC ........... A63B 60/42; A63B 53/02; G06T 7/73; G06T 2207/30221
See application file for complete search history.

(56) References Cited

U.S. PATENT DOCUMENTS

| | | | | |
|---|---|---|---|---|
| 6,363,620 | B1 * | 4/2002 | Goodjohn | A63B 60/42 473/282 |
| 6,871,414 | B2 * | 3/2005 | Burney | A63B 60/42 33/549 |
| 11,475,599 | B2 * | 10/2022 | Shaw | G01B 11/002 |
| 2005/0076708 | A1 * | 4/2005 | Cameron | A63B 53/007 73/65.03 |
| 2005/0206882 | A1 * | 9/2005 | Goodjohn | G01B 5/0023 356/138 |
| 2014/0352162 | A1 * | 12/2014 | Holtzman | G01B 5/0023 33/508 |
| 2018/0369670 | A1 * | 12/2018 | Arch | G01D 5/02 |

* cited by examiner

*Primary Examiner* — Bayan Salone
(74) *Attorney, Agent, or Firm* — Michael A. Catania

(57) ABSTRACT

An apparatus for precisely and accurately measuring the loft and lie of a golf club, and a method of using such apparatus, is disclosed herein. The apparatus includes a clamp assembly powered by a pressure unit to immobilize the head of a golf club, a scoreline measurement unit to capture scoreline angle information, loft and lie measurement arrays that can be moved along horizontal y and x axes to capture loft and lie angle information of the golf club shaft, and a computer with an algorithm that uses information captured by the scoreline measurement unit and loft and lie measurement arrays to calculate final loft and lie angle values that are accurate within +/−0.125°.

3 Claims, 6 Drawing Sheets

… … …

APPARATUS AND METHOD FOR MEASURING LIE AND LOFT OF A GOLF CLUB

CROSS REFERENCES TO RELATED APPLICATIONS

The Present Application is a divisional application of U.S. patent application Ser. No. 18/085,164, filed on Dec. 20, 2022, which is a divisional application of U.S. patent application Ser. No. 17/190,100, filed on Mar. 2, 2021, now U.S. patent Ser. No. 11/554,302, issued on Jan. 17, 2023, each of which is hereby incorporated by reference in its entirety.

STATEMENT REGARDING FEDERALLY SPONSORED RESEARCH OR DEVELOPMENT

Not Applicable

BACKGROUND OF THE INVENTION

Field of the Invention

The present invention relates to an apparatus that can measure the loft and lie of a golf club head within a fraction of a degree, and a method of operating said device.

Description of the Related Art

The prior art discloses various golf club measurement and/or bending devices. For example, U.S. Pat. No. 6,871,414 for Apparatus and Method for Measuring and Adjusting Golf Club Loft and Lie discloses a device with a clamp, cameras, and a computing device to calculate loft and lie angles, U.S. Pat. No. 7,010,965 for a Golf Club Fixture discloses a device for measuring alignment of golf club head comprising an abutment member, a clamping member, and a moveable alignment member, U.S. Pat. No. 7,403,277 for Method and Apparatus for Measuring Face Angle discloses an apparatus with a base assembly, a measuring assembly, a shaft center sensor assembly, a base plate assembly, a lie adjustment assembly, and a shaft support assembly, U.S. Pat. No. 9,566,627 for Apparatus for Adjusting the Lie and Loft of a Golf Club Head discloses an apparatus with an actuator, a base, and a clamp, and U.S. patent Ser. No. 10/343,041 for Apparatus and Method for Measuring and Adjusting a Golf Club Loft and Lie discloses an apparatus with a camera and encoders to measure loft and lie of a golf club head. However, the prior art fails to disclose a digital apparatus that uses algorithms to measure loft and lie within a fraction of a degree.

BRIEF SUMMARY OF THE INVENTION

The apparatus of the present invention comprises a plurality of high resolution sensors with lensing and lighting to capture a golf club's shaft angle and scoreline angle, a computer module to calculate these angles using a proprietary algorithm, and a clamp that constrains the head of the golf club and allows for precision bending. The measurement and bending processes are conducted within +/−0.125°.

One aspect of the present invention is a golf club measurement apparatus comprising a computer comprising a graphical user interface and an algorithm, a pressure unit comprising a tank, a pressure regulator, and a pressure booster, a clamp assembly operatively connected to the pressure unit, the clamp assembly comprising a clamp and clamp engagement and retraction mechanisms, a control device comprising a programmable logic controller, a loft drive, and a lie drive, a loft measurement array comprising a loft sensor, a first lens and first light, a lie measurement array comprising a lie sensor, a second lens and a second light, a scoreline measurement unit comprising a scoreline sensor, a third lens, and a third light, wherein the control device is operatively connected to the scoreline measurement unit, loft measurement array, and lie measurement array, wherein the computer is operatively connected to the control device, wherein the scoreline measurement array is configured to calculate a scoreline angle of a golf club, wherein the loft measurement array is configured to calculate a preliminary loft angle of the golf club, wherein the lie measurement array is configured to calculate a preliminary lie angle of the golf club, and wherein the algorithm is configured to calculate final loft and lie angles of the golf club head based upon the scoreline angle and preliminary loft and lie angles.

In some embodiments, the apparatus may further comprise a first linear rail and actuator, a second linear rail and actuator, and at least one axis encoder. The second linear rail and actuator may be attached to and slidable along the first linear rail and actuator, the at least one axis encoder may be affixed to and slidable along each of the first and second linear rail and actuators, the loft and lie measurement arrays may be affixed to an underside of the at least one axis encoder, and the control device may be operatively connected to the first and second linear rail and actuators and the at least one axis encoder. In a further embodiment, the at least one axis encoder may comprise x- and y-axis encoders.

In another embodiment, the apparatus may further comprise a rotary table disposed beneath the clamp assembly, and the rotary table may be configured to accommodate left and right handed golf clubs within the apparatus. In some embodiments, pressure unit may provide pneumatic pressure, and in other embodiments, the pressure unit may provide hydraulic pressure. In any of the embodiments, the apparatus may further comprise a support structure comprising vertical struts and a base assembly. The pressure unit, clamp assembly, and control device may be supported by the base assembly, and the scoreline measurement array, loft measurement array, and lie measurement array may be supported by the vertical struts. In a further embodiment, the computer may be affixed to a strut extending perpendicular to the vertical struts.

Yet another aspect of the present invention is a method of measuring a loft angle and lie angle of a golf club having a head and a shaft, the method comprising the steps of clamping the head within a measurement apparatus, centering the shaft within a sensor display of the measurement apparatus, calculating an angle of scorelines on the face with one or more scoreline sensors, lights, and lenses, calculating preliminary loft and lie angles of the shaft with one or more loft and lie lenses, loft and lie lights, and loft and lie sensors, and algorithmically calculating final loft and lie angles of the golf club using the scoreline angle and preliminary loft and lie angles. In a further embodiment, the method may comprise the additional steps of increasing pressure within a tank of the measurement apparatus, increasing pressure on the golf club head within the clamp using the increased pressure, and bending the club. In another embodiment, the pressure may be selected from the group consisting of hydraulic and pneumatic.

Another aspect of the present invention is a method comprising the steps of placing a head of a golf club within a clamping apparatus so that a shaft of the golf club head extends approximately vertically from the head, tightening the clamping apparatus to immobilize the golf club head, aligning loft and lie sensors using a programmable logic controller to center the shaft within a sensor display, capturing an image of scorelines on a face of the golf club head using one or more scoreline lines, scoreline lenses, and scoreline sensors, calculating a scoreline angle using the scoreline image, capturing at least one shaft image using one or more loft and lie lights, loft and lie lenses, and loft and lie sensors, calculating preliminary loft and lie angles of the shaft using the at least one shaft image, transmitting the scoreline angle and preliminary loft and lie angles to a computer comprising a calibration algorithm, and calculating with the calibration algorithm final loft and lie angles of the golf club.

In a further embodiment, the method may include the further step of displaying the final loft and lie angles on a graphical user interface associated with the computer. In another embodiment, the method may further comprise the steps of increasing pressure on the golf club head within the clamping apparatus, and bending the golf club to adjust at least one of the loft and lie of the golf club. In any of the embodiments, the step of tightening the clamping apparatus may comprise the steps of increasing pressure within a tank and directing the increased pressure through a cylinder to the clamp, and the tank and the cylinder may be operatively connected to the clamping apparatus.

Having briefly described the present invention, the above and further objects, features, and advantages thereof will be recognized by those skilled in the pertinent art from the following detailed description of the invention when taken in conjunction with the accompanying drawings.

DETAILED DESCRIPTION OF THE INVENTION

The apparatus of the present invention is a golf club measurement device that utilizes lensing and lighting to capture live imaging of the shaft and the face of a golf club. This is particularly useful for measuring irons and wedges. The apparatus comprises a computer that executes an algorithm to capture loft and lie deflection of the head after the head is clamped within the apparatus. The device is capable of measuring the loft and lie of a golf club to a tolerance of +/−0.125°, and is reproducible machine to machine. The apparatus includes a computer with a calibration algorithm that automatically best fits results to match coordinate measurement machine (CMM) data.

Figure 1:
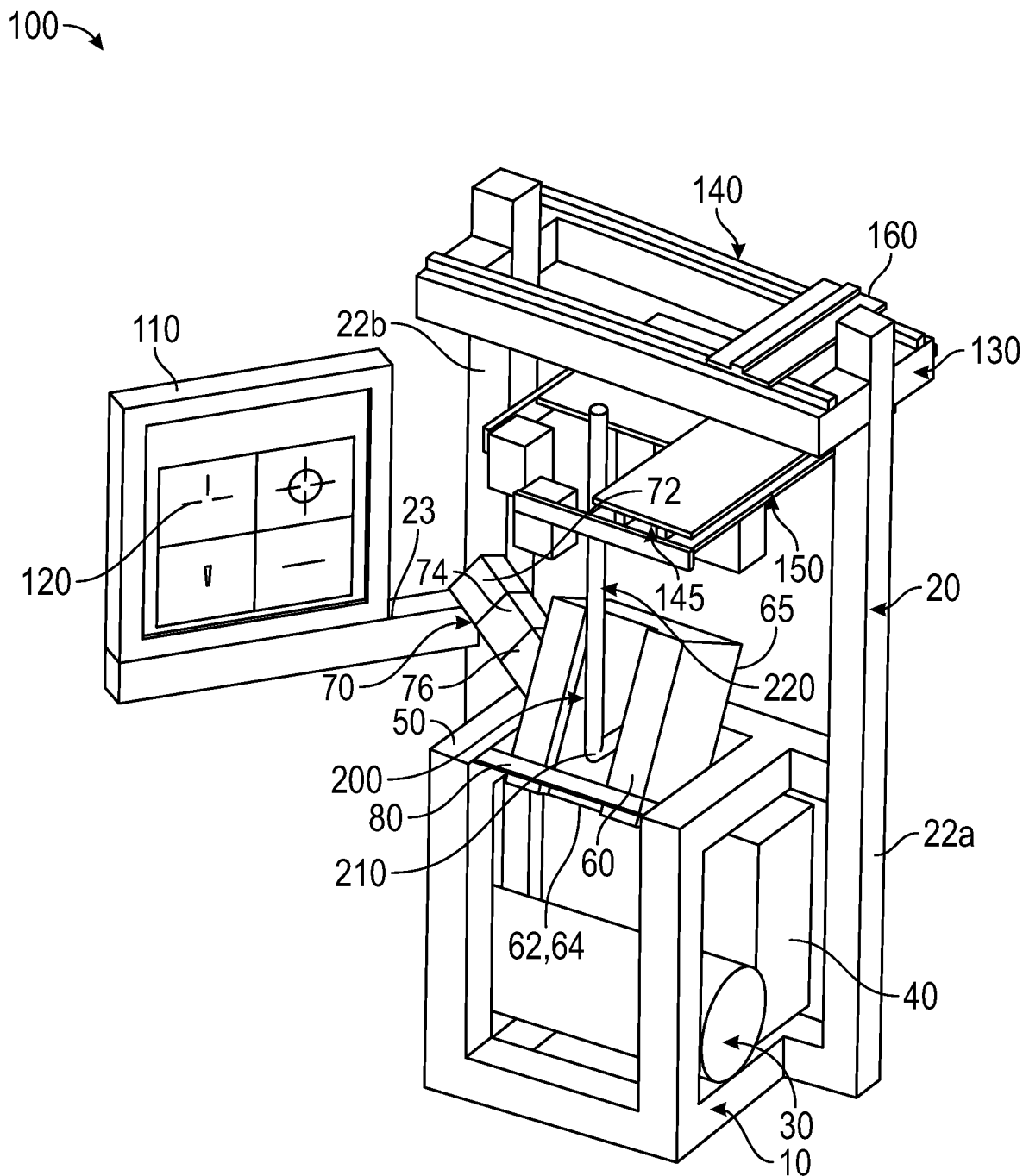
FIG. 1 is a front perspective view of an apparatus of the present invention.
Figure 2:
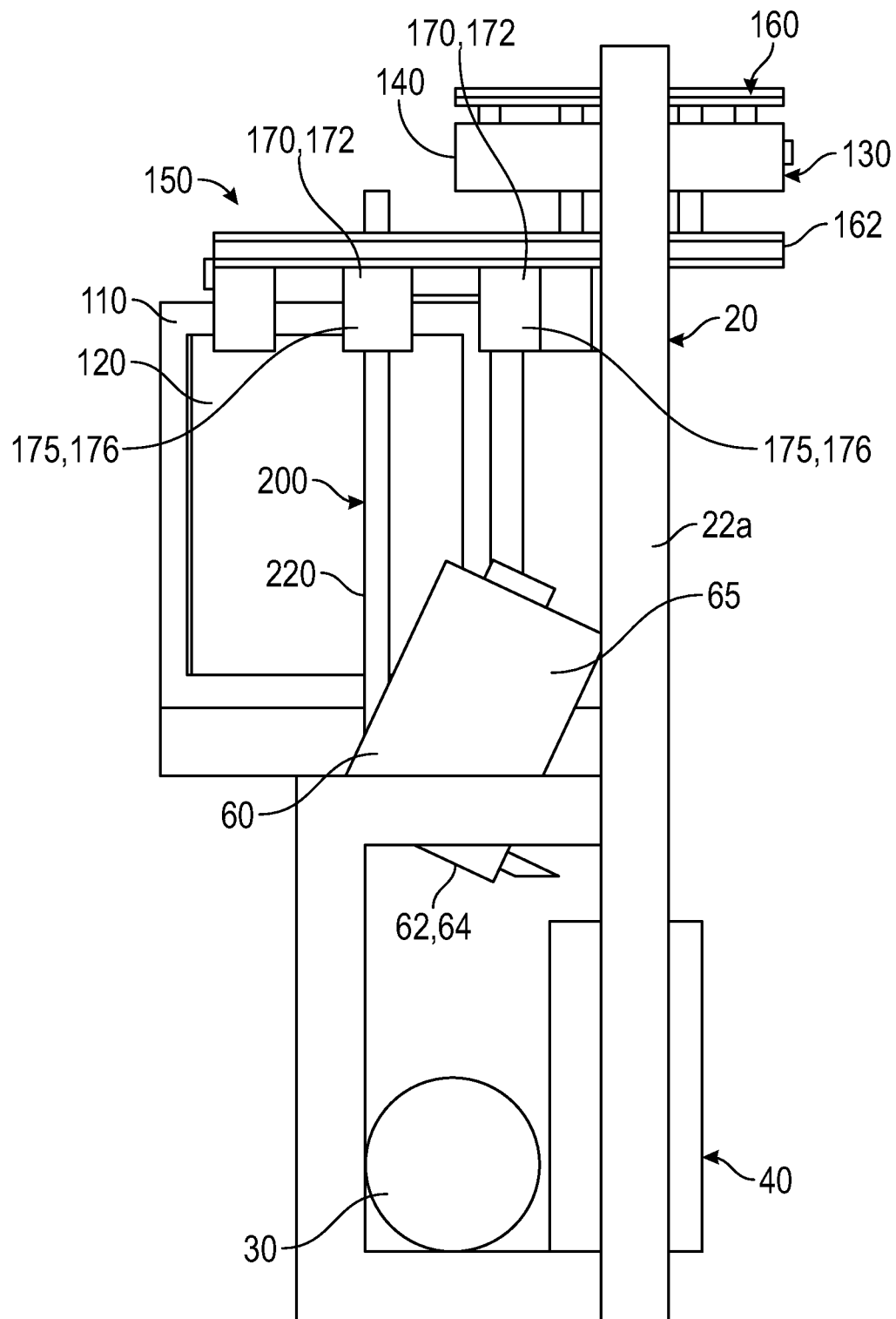
FIG. 2 is a side plan view of the embodiment shown in FIG. 1.
Figure 3:
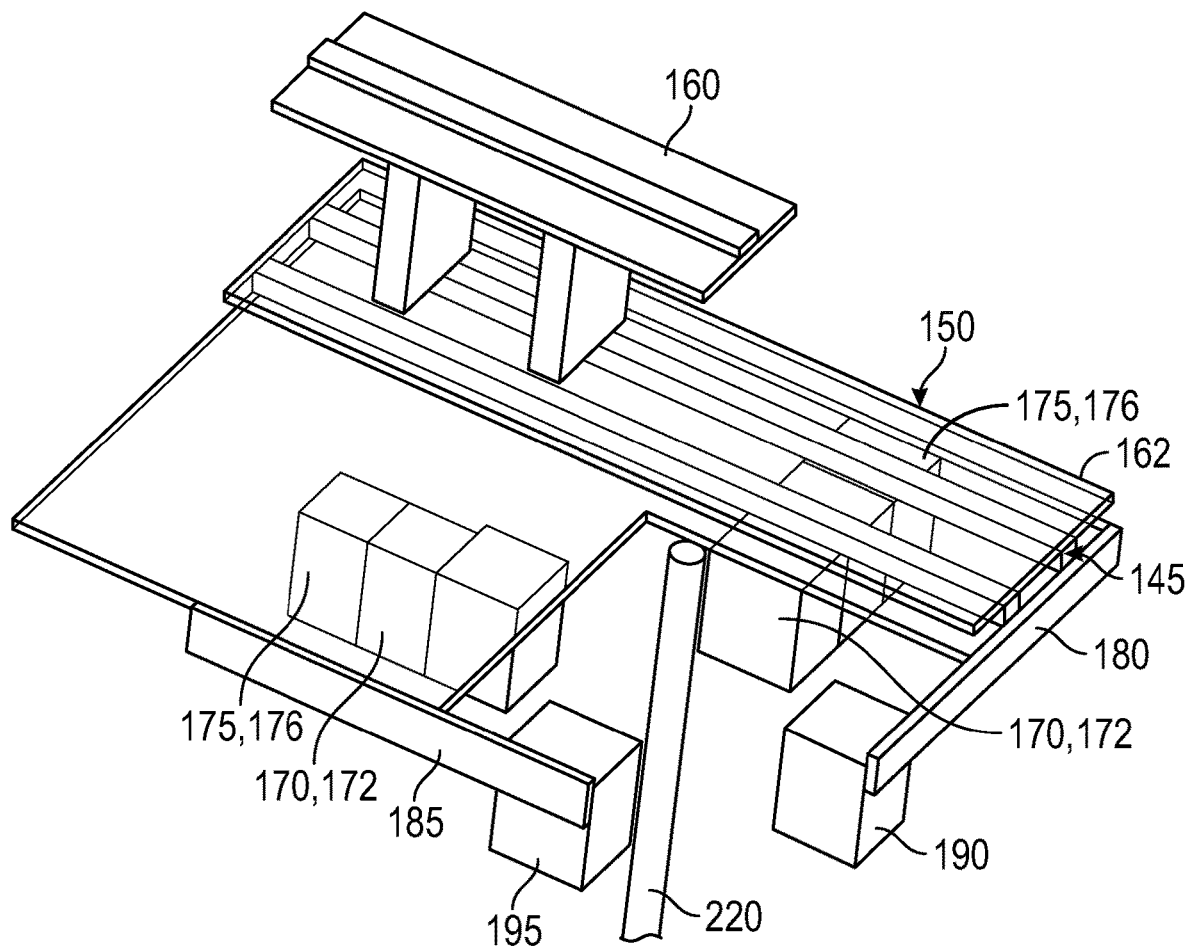
FIG. 3 is a side perspective view of the slidable assembly shown in FIGS. 1-2.

FIGS. 1-3 illustrate the apparatus 100 of the present invention. Shown in FIG. 1, the skeletal support of the apparatus 100 is provided by a base assembly 10 and a vertical frame 20. A pressure unit 30 comprising a tank 32, a pressure regulator 34, and a pressure booster 36 sits at a lower portion of the base assembly 10 proximate a control device 40 comprising a programmable logic controller (PLC) 42, an Ethernet switch 44, an x-axis (loft) drive 46, and a y-axis (lie) drive 48. Above these components, at an upper portion of the base assembly 10, sits a rotary table 50 to allow for right- and left-handed golf club measurement, and a static-mounted clamp 60 powered by hydraulic or pneumatic force from a cylinder 65 operatively connected to the pressure unit 30, which is configured to immobilize a golf club 200 by gripping its head 210 so that the shaft 220 extends vertically, as if it were being held at address by a golfer. Clamp engagement and retraction mechanisms 62, 64 are located beneath the static-mounted clamp 60 itself. The base assembly also includes a control panel 80 that is operatively connected to sensors (described in further detail below) so a user can adjust their placement and focus. A scoreline measurement unit 70 comprising a scoreline lens 72, a scoreline sensor 74, and a scoreline light 76 is disposed proximate the clamp 60 and directed at the face of the golf club head 210 when it is immobilized within the clamp 60.

Figure 4:
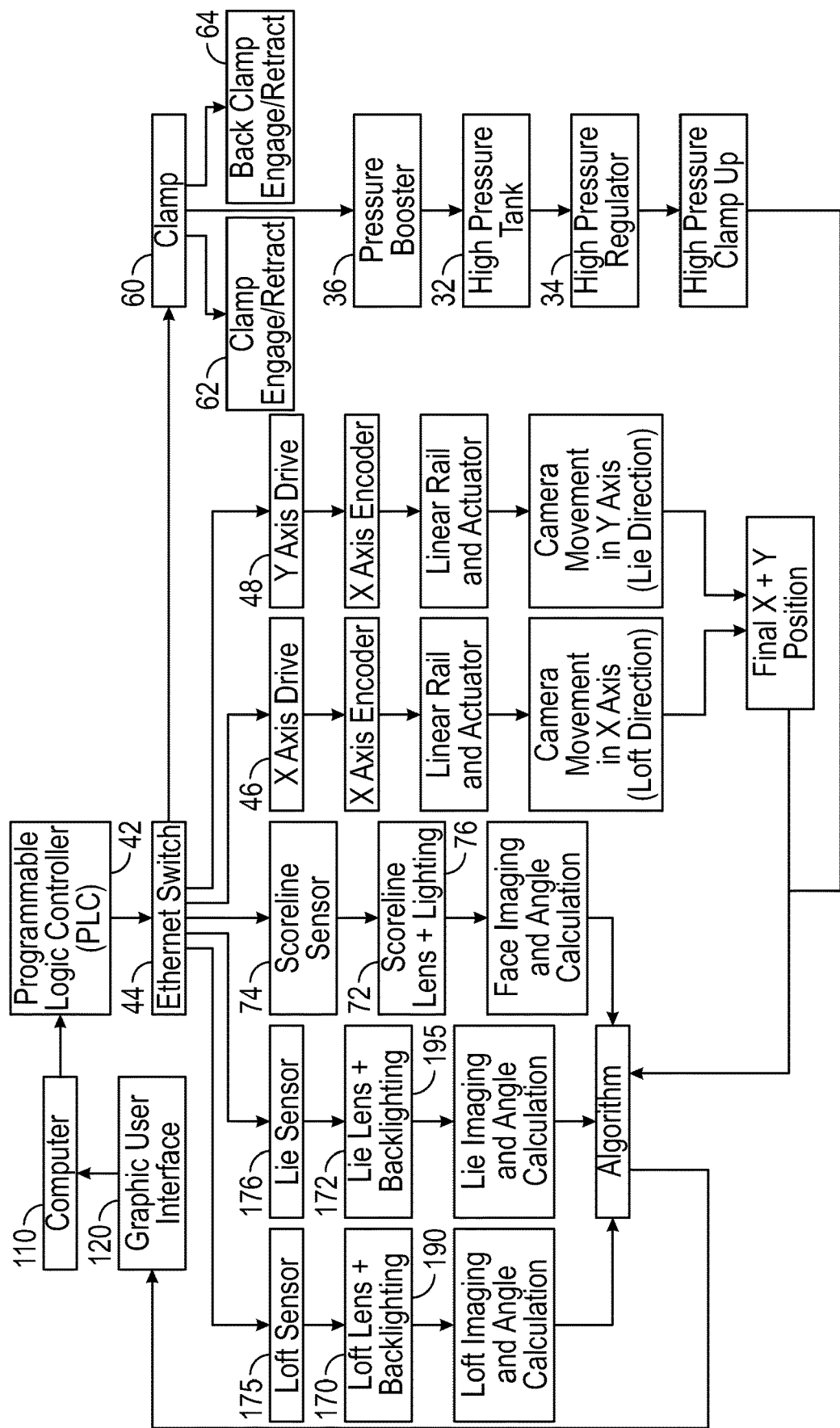
FIG. 4 is a schematic illustrating interoperability of the parts shown in FIGS. 1-3.

The base assembly 10 is operatively connected to a computer 110, which includes a graphical user interface (GUI) 120 where a user can interact with and control the functionality of the apparatus 100, including executing the method 300 described in more detail below. The computer may be attached to the base assembly by a strut 23 or other connector part. The base assembly 10 is also affixed to the vertical frame 20, which comprises a plurality of struts 22a, 22b, at the top of which is mounted an upper assembly 130. The upper assembly 130 includes, at its top, a linear rail and actuator 140, to which a slidable assembly 150 is affixed. The slidable assembly 150 includes another linear rail and actuator 145 and x- and y-axis encoders 160, 162 that can slide along the linear rail and actuators 140, 145 according to instructions entered into the computer 110 via the GUI 120. Loft and lie lenses 170, 172 and loft and lie sensors 175, 176 extend from the underside of the encoder 162, as do pressure cylinders 180, 185 that connect to loft and lie lights 190, 195. The schematic of FIG. 4 further illustrates how these elements operate with one another.

Figure 5:
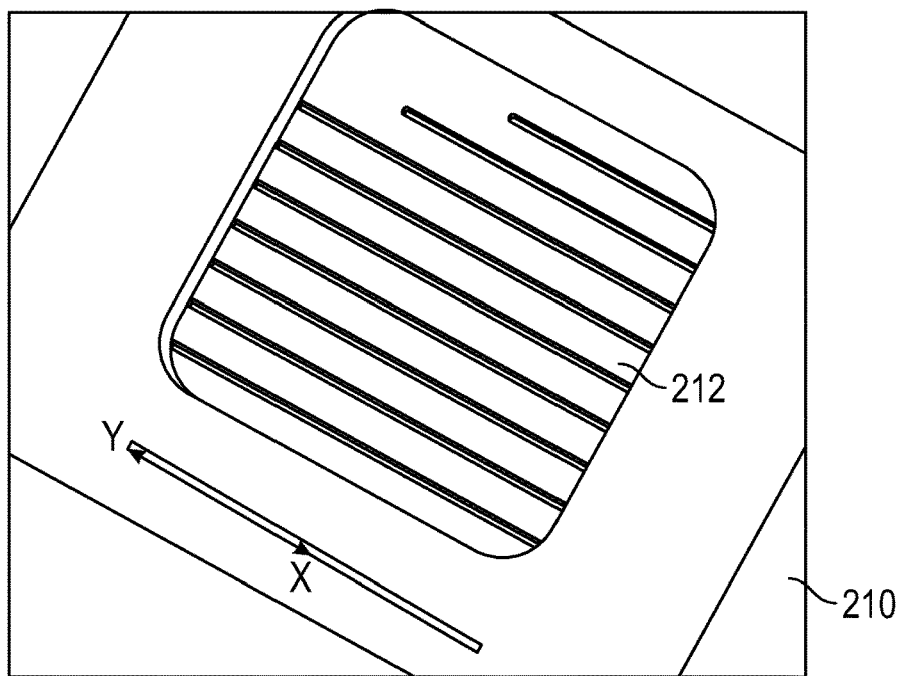
FIG. 5 is an image of a golf club face taken using the apparatus of the present invention.
Figure 6:
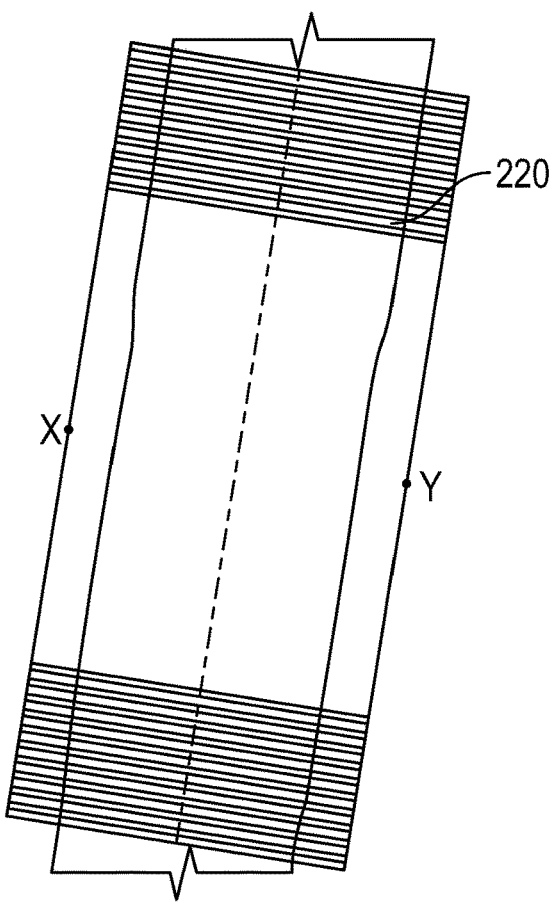
FIG. 6 is an image of a golf club shaft taken using the apparatus of the present invention.
Figure 7:
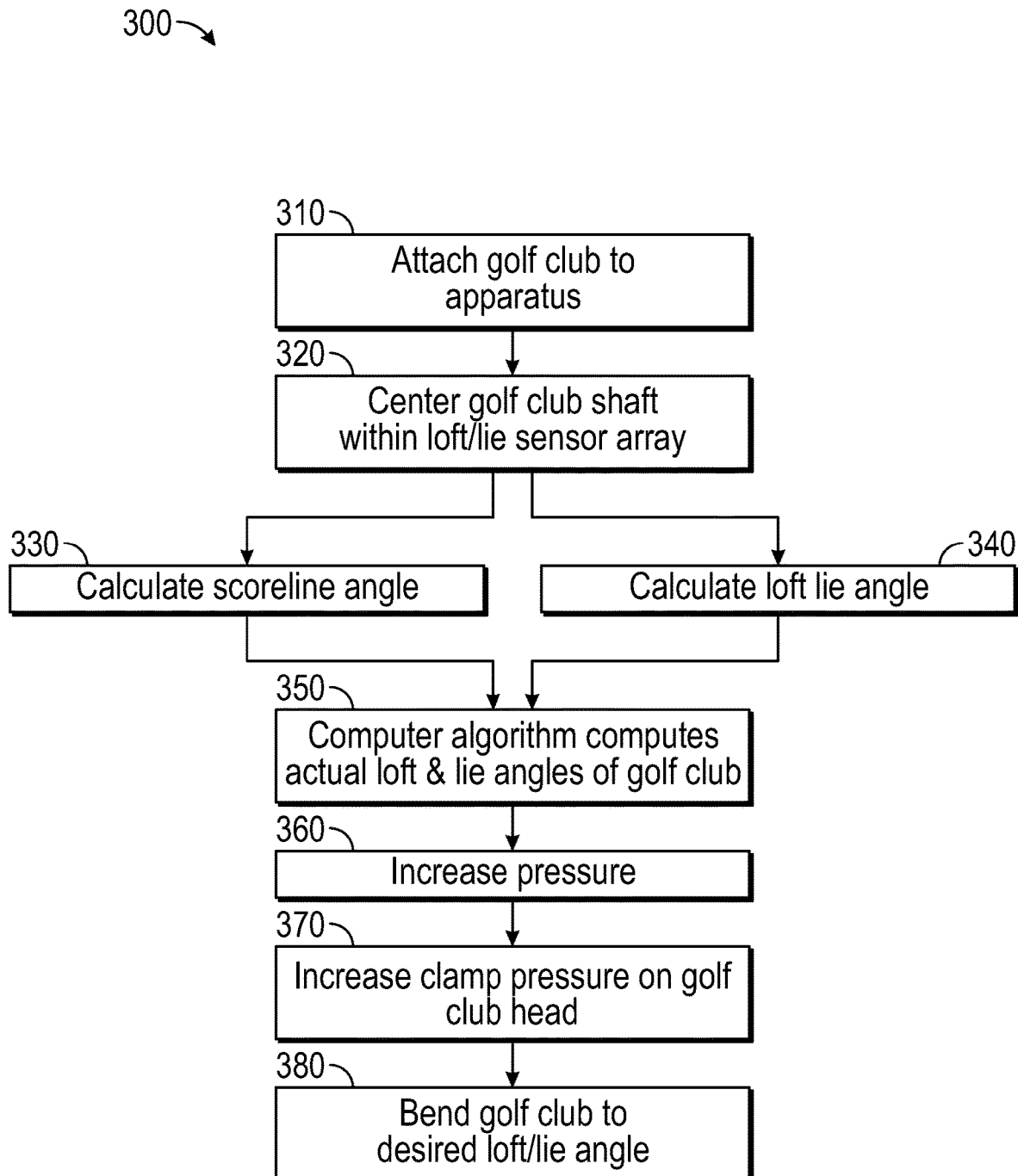
FIG. 7 is process flow chart illustrating a method of operating the embodiment shown in FIG. 1.

A method 300 of precisely and accurately measuring the loft and lie of a golf club 200 is shown in FIG. 7. In a first step 310, a golf club 200 is affixed to the apparatus 100 by placing the head 210 within and tightening the static-mounted clamp 60. In a second step 320, the programmable logic controller 42 is used to move the loft and lie sensors 175, 176 along the rails 140, 145 to center the shaft 220 of the golf club 200 within the sensor 175, 176 display. In a third step 330, the scoreline light 76 and scoreline lens 72 are used to illuminate and focus the scoreline sensor 74 image (an example of which is shown in FIG. 5), thereby allowing the scoreline sensor 74 to calculate the scoreline 212 angle. In a fourth step 340, which may be performed simultaneously or before the third step 330, the loft and lie lenses 170, 172 and loft and lie lights 190, 195 brighten up and focus the loft and lie sensor 175, 176 image (an example of which is shown in FIG. 6) to allow the sensors 175, 176 to calculate the loft and lie angles of the shaft 220. In a fifth step 350, the angles calculated by the sensors 74, 175, 176 are fed into the computer 110, which uses the algorithm to compute final loft and lie angles of the golf club 200 and then display these values on the GUI 120.

If the operator wishes to bend the golf club head based upon the measurements calculated by the apparatus 100, in a sixth step 360 the pressure boosters increase air pressure, which can be stored in the high pressure tank, and in a seventh step 370 the air cylinder uses the boosted air pressure to clamp the golf club head 210 to further immobilize it for bending during an eighth, bending step 380, wherein the user bends the club to specification using the GUI.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications combinations, and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claim:

1. A method of measuring a loft angle and lie angle of a golf club having a head and a shaft, the method comprising:
    clamping the head within a measurement apparatus;
    centering the shaft within a sensor display of the measurement apparatus;
    calculating an angle of scorelines on a face with one or more scoreline sensors, lights, and lenses;
    calculating preliminary loft and lie angles of the shaft with one or more loft and lie lenses, loft and lie lights, and loft and lie sensors;
    algorithmically calculating final loft and lie angles of the golf club using the scoreline angle and preliminary loft and lie angles;
    increasing a pressure within a tank of the measurement apparatus;
    increasing a pressure on the golf club head within a clamping apparatus using the increased pressure; and
    bending the club.

2. The method of claim 1 wherein the pressure is selected from the group consisting of hydraulic and pneumatic.

3. The method of claim 1 further comprising displaying the final loft and lie angles on a graphical user interface associated with the computer.

* * * * *